Sept. 20, 1949.  V. C. J. PETERSON  2,482,204
WIRE ROPE SPLICE
Filed Feb. 10, 1948
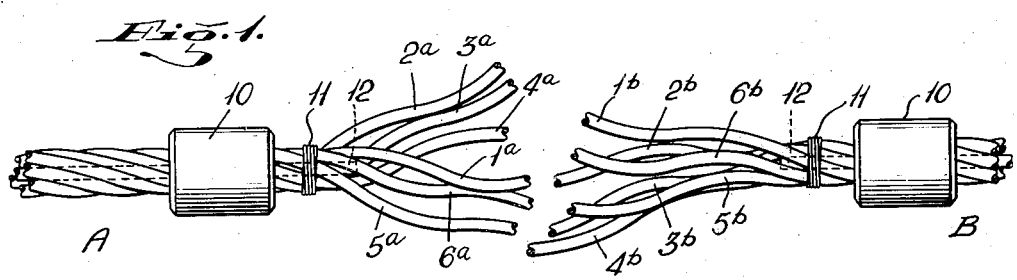
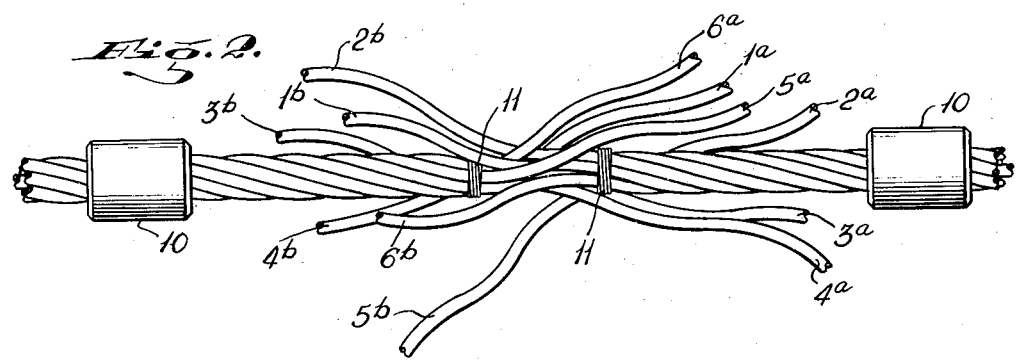
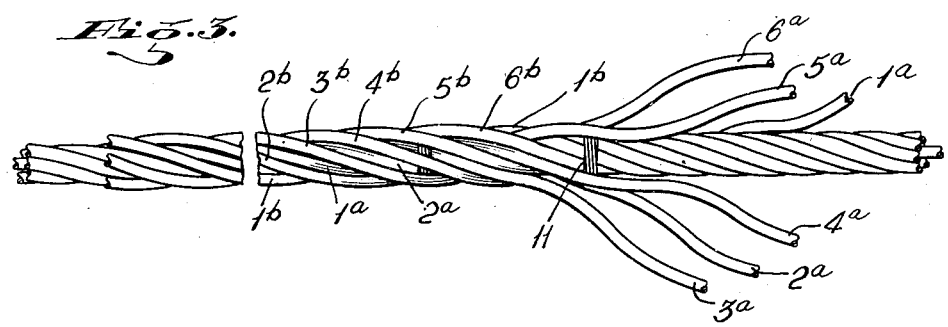
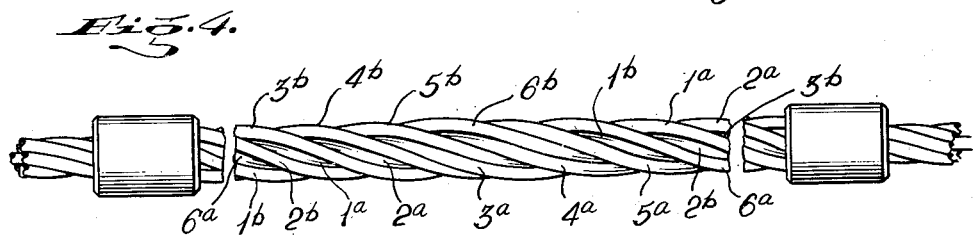
INVENTOR
VINCENT C.J. PETERSON
BY
ATTORNEY Patented Sept. 20, 1949

2,482,204

UNITED STATES PATENT OFFICE 2,482,204

WIRE ROPE SPLICE

Vincent C. J. Peterson, York, Pa., assignor to American Chain & Cable Company, Inc., Bridgeport, Conn., a corporation of New York Application February 10, 1948, Serial No. 7,405

3 Claims. (Cl. 57—142)

This invention concerns splices, particularly those splices used in making grommets of wire rope which are intended to be used as slings.

A grommet intended to be utilized as a sling can be fabricated in at least three different ways, according to the prior art. Short splices of a well-known kind can be used to join the end of a rope, thus making an endless rope. Another method is to utilize a technique similar to that used in making long or running splices. This is done by winding a single strand around and around a core so that the eventual product is a rope made of a single strand laid around a core so many times as to result in an endless rope with only a single cut strand. Another method of making a grommet is to fasten the ends of a length of wire rope together with clips or other applied fasteners.

All of the above forms of splice have certain disadvantages. Short splices are difficult to make and require a strong and skillful man in the fabrication, and furthermore weaken the rope to a certain extent both at the splice and in the immediate neighboring rope because of the tucking which must be employed to interlace properly the strands. Grommets made with long, or running splices have a disadvantage that sometimes the ends of the cut strands rise to the surface of the rope and form dangerous projections which catch on the hands of those using the grommet. Those slings which are made by winding a single strand around and around an endless central core to eventually form what appears to be endless rope with but a single cut in any of the strands are difficult to make in large size because of the method of stranding employed which requires considerable lifting of a heavy spool or coil to pass the strand around the endless central core. Furthermore unless the strand is preformed, it is extremely difficult to assure that each strand is as tight around the core as the next strand and is carrying its proper share of the load.

Clips and other mechanical fasteners securing the ends of rope together are more or less disliked because of their large size and the projections inherent in them. Furthermore they are notorious for their low efficiency, that is, the tendency they have to permit the rope to pull out of the clip or else cause strains in the rope which cause the rope to break at or in the neighborhood of the clip.

It is, therefore, an object of the present invention to provide a splice which can be used for making endless wire grommets which can be applied by comparatively unskilled workmen without too much physical exertion.

It is a further object of the present invention to provide a splice which is cheap to produce and can be produced with a minimum expenditure of time.

It is a further object of this invention to produce a splice of reasonable length which is at the same time as strong as the rope which is joined by the splice.

It is a further object of the present invention to provide a splice which can be utilized as the part of the rope subjected to the maximum wear; that is, one which can be used as a grommet splice and which can be applied over the lifting hook when the grommet is to be supported from a hook.

It is a further object of the present invention to provide a splice for making endless grommets which does not require any expensive fittings.

Referring now to the drawings:

Figure 1 is a showing of a pair of wire rope ends prepared for splicing;

Figure 2 has a similar showing of the rope ends shown in Figure 2 after they are "married";

Figure 3 is a showing of the ropes of Figures 1 and 2 with one end of the splice completed;

Figure 4 is a showing of the splice completed.

This splice has been illustrated in conjunction with a six part wire rope. It is to be understood that the splice can be used with any number of parts.

It is to be understood that this splice is intended primarily for use with wire rope or cable, as the conventional splices are satisfactory in manila or other textile ropes. It is to be further understood that the strands, indicated in the drawings may be considered as individual wires, strands, ropes or even cables, and that, so far as the application of the splice is concerned, the expression "strand" is intended to mean one of the last wires or groups of wires which is operated upon in "closing" the completed structure.

Referring now to Figure 1, two rope ends are shown after preliminary preparations. Ropes A and B may be the ends of the same rope or two separate ropes to be joined. As a first operation, a ferrule 10 is applied to each rope end. This ferrule is considerably larger in diameter than the rope itself as will presently appear and can be simply slipped over the cut end of each rope. After the ferrule 10 is in place, the rope is seized at 11 in each instance. The distance between seizing 11 and the end of the rope is any reasonable distance but three lays has been found sufficient. After such seizing the individual strands are unlaid from the core back to the seizing. The core 12 of each rope is cut short near the seizing leaving the ropes in the condition shown in Figure 1. After this has been done, the ends of the ropes are married, that is, the strands of rope A are passed between the strands of rope B in such a fashion that each pair of strands on any one rope has a strand from the other rope passing between it. This is substantially the same as a procedure employed in making many conventional splices in manila lines.

For convenience, the strands of each rope are numbered, from 1 to 6, with a subscript "a" or "b," which refers to the rope of which it forms a part. It will be noted that in marrying the ends, strand 5a has been shown as passing between strands 6b and 1b, 6a as passing between strands 1b and 2b, and so on around the entire splice. Also, strand 1b can be said to be between strands 5a and 6a, and so on.

After the ends have been married, the actual making of a splice is performed. This consists of wrapping each individual strand of one rope around the laid-up portion of the other rope. As the laid-up portion of a rope presents a helically grooved appearance due to the presence of valleys between the strands, it is a simple matter to lay a strand in such a groove. The pitch of the overlying strand will be the same as the pitch of the underlying strands. As this is done for each strand on any one rope, the partially completed splice will present the appearance shown in Figure 3. Although it is preferable to utilize preformed wire rope for this splice because of the natural inclination of the overlying strands to follow the pitch of the valleys in the underlying laid rope, the process can be employed with ordinary wire rope if care is taken to fasten each strand down as it is laid in place. It is to be understood, of course, that the seizing 11 is removed before such laying-up of the strands is attempted.

The resulting structure has any strand laid in the valley between the pair of strands it was placed between in the marrying process. Thus, by way of example, strand 4b which was inserted between strands 2a and 3a, lies in the valley between strands 2a and 3a as can be seen in Figure 3.

The same process is employed on the other end of the splice. This results in a structure having the appearance of Figure 4. The splice then presents the appearance of a rope with overlying strands which overlying strands emerge from the center of the splice and pass around the laid rope to a point away from the center.

After the splice has been completed so far as the disposition of the strands are concerned, the ferrules 10 are compressed around the free ends of the outer strands. If desired, an additional ferrule may be placed at the center of the splice.

The splice depends for its efficiency not only upon the presence of the ferrule which need not be long enough or tight enough to transmit the entire load from the interior rope to the exterior strands, but also depends upon the friction developed between the overlying strands and the underlying rope. In fact it is possible, by making a long enough splice, to dispense with ferrules and utilize merely seizing to hold the ends of the strand in place. This construction, however, requires a splice which is inordinately long and the shown structure is better from any point of view, including compactness and neat appearance.

Assuming a completed splice with ferrules in place is subjected to a tension tending to cause slippage, the following actions take place. Increase in length of the space between the ferrules, caused by stretching of the inner ropes, and movement of rope A (the laid section thereof) away from the laid section of rope B, places the outer strands under tension. As they are helically disposed, they hug the inner strands more closely because of this tension. Accordingly, considerable friction is developed between the inner and outer strands, which transfers the load from one to the other. Because of this, the ferrules 10 are not required to transmit the entire load, although, by making them long enough, they could be made so to do.

In addition to the effect noted, there is a tendency for the outer strands to wedge themselves more tightly in place when tension is placed on them which would tend to resist pulling them out from under the ferrules.

It is to be understood that the mentioned method of making a splice is illustrative of the invention and that it is possible to deviate from the description somewhat and still remain within the scope of the appended claims.

I claim:

1. A splice for two rope ends comprising a helically laid portion and a terminal splayed portion on each rope end, the strands of the splayed portion of each rope end passing between the strands of the splayed portion of the other rope end and helically disposed in the valleys of the laid portion of the other rope end, and means securing the strands of the splayed portion of each rope end in the valleys of the underlying laid portion of the other rope end.

2. A splice for two rope ends comprising a helically laid portion and a terminal splayed portion on each rope end, the strands of the splayed portion of each rope end passing between the strands of the splayed portion of the other rope end and helically disposed in the valleys of the laid portion of the other rope end, the strands of each splayed portion terminating in a common region, and a ring compressed around the ends of the strands of each rope end pressing the strands for part of their length into the valleys of the laid portion of the other rope end.

3. A splice for two rope ends comprising a helically laid portion and a terminal splayed portion on each rope end, the strands of the splayed portion of each rope end passing between the strands of the splayed portion of the other rope end and helically disposed in the valleys of the laid portion of the other rope end, each strand of the splayed portion of each rope end lying in the valley between the strands of the other rope end through which it passes, the ends of the strands of each rope end terminating in a common region, and a ring compressed around the ends of the strands of each rope end passing the strands for a part of their length into the valleys of the laid portion of the other rope end.

VINCENT C. J. PETERSON.

REFERENCES CITED

The following references are of record in the file of this patent:

UNITED STATES PATENTS

| Number | Name | Date |
|---|---|---|
| 190,823 | Channon | May 15, 1877 |
| 2,414,664 | Peterson | Jan. 21, 1947 |